(12) United States Patent
Sawada et al.

(10) Patent No.: US 10,353,355 B2
(45) Date of Patent: Jul. 16, 2019

(54) INDOOR ENVIRONMENT MODEL CREATION DEVICE

(71) Applicant: Mitsubishi Electric Corporation, Chiyoda-ku (JP)

(72) Inventors: Masae Sawada, Chiyoda-ku (JP); Mio Motodani, Chiyoda-ku (JP); Osamu Nakajima, Chiyoda-ku (JP); Takaya Yamamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 17 days.

(21) Appl. No.: 15/565,528

(22) PCT Filed: Oct. 28, 2015

(86) PCT No.: PCT/JP2015/080457
§ 371 (c)(1),
(2) Date: Oct. 10, 2017

(87) PCT Pub. No.: WO2016/185630
PCT Pub. Date: Nov. 24, 2016

(65) Prior Publication Data
US 2018/0088544 A1 Mar. 29, 2018

(30) Foreign Application Priority Data

May 18, 2015 (JP) ................. 2015-101268

(51) Int. Cl.
*F24F 11/00* (2018.01)
*F24F 11/89* (2018.01)
(Continued)

(52) U.S. Cl.
CPC ........ *G05B 13/048* (2013.01); *F24F 11/0008* (2013.01); *F24F 11/89* (2018.01);
(Continued)

(58) Field of Classification Search
CPC ..... G05B 13/048; F24F 11/0008; F24F 11/89; F24F 2120/10; F24F 2110/70; G05D 23/1932; G06F 19/00; Y02P 90/84
(Continued)

(56) References Cited

U.S. PATENT DOCUMENTS 5,292,280 A * 3/1994 Janu .................... F24F 7/08
454/229
2003/0216837 A1 11/2003 Reich et al.
(Continued)

FOREIGN PATENT DOCUMENTS

JP 3350277 B2 11/2002
JP 2008-298296 A 12/2008
(Continued)

OTHER PUBLICATIONS

International Search Report dated Jan. 19, 2016 in PCT/JP2015/080457 filed Oct. 28, 2015.
(Continued)

*Primary Examiner* — Brian W Wathen
*Assistant Examiner* — Mohammed Shafayet
(74) *Attorney, Agent, or Firm* — Oblon, McClelland, Maier & Neustadt, L.L.P.

(57) ABSTRACT

An indoor environment model creation device is configured to create an indoor environment model of an indoor space in which air-conditioning equipment configured to condition air, an indoor humidity sensor configured to measure an indoor humidity of the indoor space, and a $CO_2$ sensor configured to measure a $CO_2$ concentration in the indoor space are installed. The indoor environment model includes a plurality of physics models in which heat, moisture, and $CO_2$ concentration parameters are included. The indoor environment model creation device includes: a data storage unit configured to store operation data of the air-condition-
(Continued)

ing equipment in a learning target period as learning-use input data, and store measurement data measured by the $CO_2$ sensor and the humidity sensor; and a model parameter learning unit configured to comprehensively learn the plurality of physics models with use of the learning-use input data and the measurement data, which are stored in the data storage unit.

9 Claims, 4 Drawing Sheets (51) Int. Cl.
| | | |
|---|---|---|
| *G05B 13/04* | (2006.01) | |
| *G05D 23/19* | (2006.01) | |
| *F24F 110/70* | (2018.01) | |
| *F24F 120/10* | (2018.01) | |
| *G06F 19/00* | (2018.01) | |

(52) U.S. Cl.
CPC ......... *G05D 23/1932* (2013.01); *G06F 19/00* (2013.01); *F24F 2110/70* (2018.01); *F24F 2120/10* (2018.01); *Y02P 90/84* (2015.11)

(58) Field of Classification Search
USPC ........................................................ 700/300
See application file for complete search history.

(56) References Cited

U.S. PATENT DOCUMENTS

| | | | | |
|---|---|---|---|---|
| 2005/0192915 A1* | 9/2005 | Ahmed | ................... | G06N 3/02 706/21 |
| 2006/0184283 A1* | 8/2006 | Lee | ................... | F24F 11/30 700/276 |
| 2010/0025483 A1* | 2/2010 | Hoeynck | ................... | H02J 3/14 236/1 C |
| 2010/0256958 A1* | 10/2010 | Yoo | ................... | F24F 11/30 703/2 |
| 2010/0262298 A1* | 10/2010 | Johnson | ................... | F24F 11/30 700/277 |
| 2011/0093126 A1* | 4/2011 | Toba | ................... | G05B 15/02 700/291 |
| 2012/0023428 A1* | 1/2012 | Kennard | ................... | G05D 23/1917 715/771 |
| 2012/0232702 A1* | 9/2012 | Vass | ................... | G05D 23/1934 700/277 |
| 2014/0000836 A1* | 1/2014 | Xu | ................... | G05D 22/02 165/11.1 |
| 2014/0207424 A1* | 7/2014 | Singh | ................... | G06F 17/5009 703/1 |
| 2014/0365017 A1* | 12/2014 | Hanna | ................... | F24F 11/30 700/276 |
| 2015/0127164 A1* | 5/2015 | Wang | ................... | G05B 15/02 700/275 |
| 2015/0219358 A1* | 8/2015 | Alfakhrany | ................... | E04F 17/04 454/256 |
| 2016/0018124 A1 | 1/2016 | Yamamoto et al. | | |
| 2016/0054018 A1* | 2/2016 | Motodani | ................... | F24F 11/56 700/276 |
| 2016/0249487 A1* | 8/2016 | Bhagwat | ................... | G06F 1/20 |
| 2016/0261116 A1* | 9/2016 | Barooah | ................... | G06Q 50/06 |

FOREIGN PATENT DOCUMENTS

| | | |
|---|---|---|
| JP | 2011-214794 A | 10/2011 |
| JP | 5008739 B2 | 8/2012 |
| WO | WO 2014/055059 A1 | 4/2014 |
| WO | WO 2014/174871 A1 | 10/2014 |

OTHER PUBLICATIONS

Extended European Search Report dated Jan. 2, 2019 in European Patent Application No. 15892629.5 citing documents AA and AO therein, 6 pages.

\* cited by examiner

INDOOR ENVIRONMENT MODEL CREATION DEVICE

TECHNICAL FIELD

The present invention relates to an indoor environment model creation device configured to create an indoor environment model to be used to predict a load on an air-conditioning system.

BACKGROUND ART

An air-conditioning system in an office/commercial building or other structures is required to run optimally on the whole through cooperation among various air-conditioning apparatus that are components of the air-conditioning system, while maintaining an indoor environment that is felt comfortable to a person in the room. Through prediction of the indoor environment accurately, each type of load to be processed by the air-conditioning system is figured out and efficient operation can be determined for each apparatus. Several methods such as ones given below have hitherto been proposed as methods of predicting an indoor environment and an air-conditioning load (see Patent Literature 1 to Patent Literature 3, for example).

In Patent Literature 1, there is disclosed a building air-conditioning heat load prediction device in which the amount of heat taken in from walls, the amount of heat taken in from glass surfaces, the amount of heat generated by human body, the amount of heat generated by an electric apparatus, and the amount of any other heat that is generated or taken in are calculated by inputting the outside temperature, the amount of solar radiation, a head count fluctuation pattern, and other types of information to a building air-conditioning heat load model, and past heat load performance data is used in combination with the calculated heat amounts to predict a building air-conditioning heat load. In Patent Literature 2, there is disclosed a building ventilation amount and temperature prediction system configured to predict a ventilation amount and a temperature in a building by calculating the ventilation amount and temperature of each room a number of times in an alternating manner based on house-by-house data, which includes the shape and opening of each room, and meteorological data, which includes the wind velocity and the outside air temperature, until the calculated ventilation amounts and temperatures are converged. In Patent Literature 3, there is disclosed an air-conditioning control device configured to estimate the number of people in a room from a measured $CO_2$ concentration value, predict a heat load dependent on estimated heat generation by human body or on the estimated number of people, and control an air-conditioning apparatus based on the estimated heat load.

CITATION LIST

Patent Literature

Patent Literature 1: Japanese Patent No. 3350277
Patent Literature 2: Japanese Patent No. 5008739
Patent Literature 3: Japanese Unexamined Patent Application Publication No. 2008-298296

SUMMARY OF INVENTION

Technical Problem

A method using a model that follows a physics formula as those in Patent Literature 1 and Patent Literature 2 is capable of reconstructing a heat load, indoor temperature fluctuations, or a similar physical phenomenon. With the models of Patent Literature 1 and Patent Literature 2, however, the number of people in a room and other parameters that have a significant effect on an air-conditioning load and that vary depending on the use of the building are needed for each targeting building as setting parameters in addition to the physical properties of building materials and the shape of the building, and obtaining numerous setting parameters is difficult. In Patent Literature 3, the number of people in a room is obtained from a measured value of $CO_2$ concentration in the room and the heat load, which is dependent on the number of people in a room, is predicted without directly inputting how many people are in the room. A problem of Patent Literature 3, however, is low accuracy because the air-conditioning load is estimated only from a measured $CO_2$ concentration value.

The present invention has been made in view of the problems described above, and an object of the present invention is therefore to provide an indoor environment model creation device that ensures a prediction of a load on an air-conditioning system accurately without setting numerous parameters.

Solution to Problem

According to one embodiment of the present invention, there is provided an indoor environment model creation device, which is configured to create an indoor environment model of an indoor space in which air-conditioning equipment, a $CO_2$ sensor, and a humidity sensor are installed, the air-conditioning equipment being configured to condition air, the $CO_2$ sensor being configured to measure a $CO_2$ concentration in the indoor space, the humidity sensor being configured to measure an indoor humidity of the indoor space. The indoor environment model includes a physics model including a heat parameter, a physics model including a moisture parameter, and a physics model including a $CO_2$ concentration parameter. The indoor environment model creation device includes: a data storage unit configured to store operation data of the air-conditioning equipment in a learning target period as learning-use input data, and store measurement data measured by the $CO_2$ sensor and the humidity sensor; and a model parameter learning unit configured to comprehensively learn a plurality of physics models with use of the learning-use input data and the measurement data, which are stored in the data storage unit.

Advantageous Effects of Invention

According to the indoor environment model creation device of the one embodiment of the present invention, a highly accurate model consistent with physical phenomena can be obtained by comprehensively learning the indoor environment model that is made up of the plurality of physics models.

DESCRIPTION OF EMBODIMENTS

Figure 1:
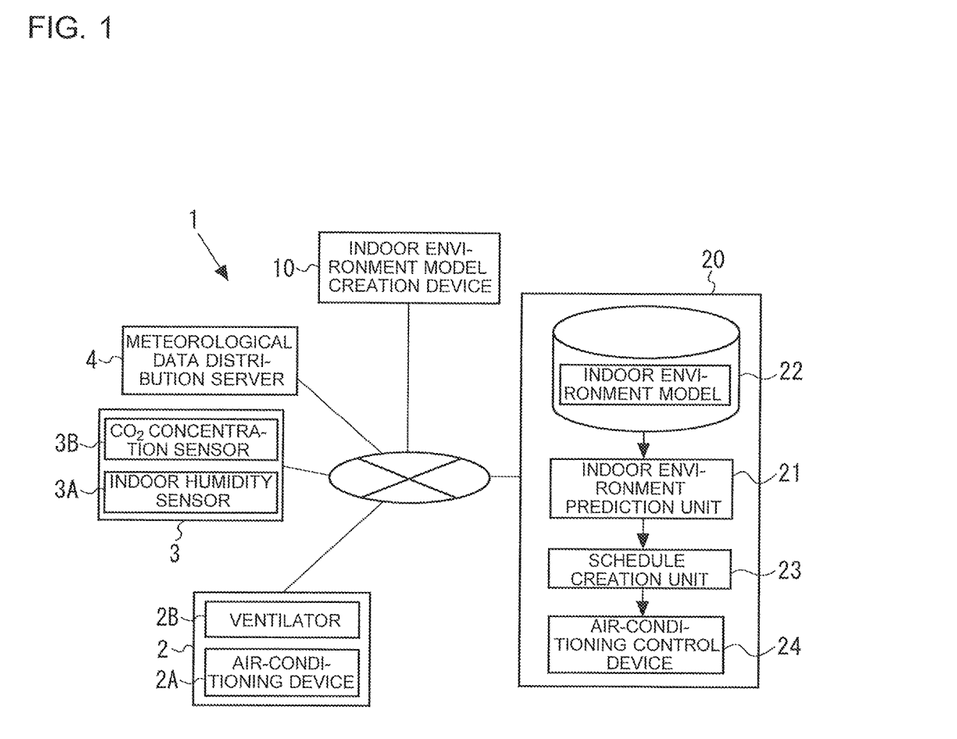
FIG. 1 is a block diagram for illustrating an example of an air-conditioning control system that employs an indoor environment model creation device according to an embodiment of the present invention.

An indoor environment model creation device according to an embodiment of the present invention is described below with reference to the drawings. FIG. 1 is a block diagram for illustrating an example of an air-conditioning control system that employs the indoor environment model creation device according to the embodiment of the present invention. An air-conditioning control system 1 of FIG. 1 is configured to predict the indoor environment based on an indoor environment model of a space to be air-conditioned by air-conditioning equipment 2, and to control the air-conditioning equipment 2 in a manner suited to the predicted indoor environment.

The air-conditioning control system 1 includes the air-conditioning equipment 2 configured to condition the air in an indoor space, a sensor group 3 configured to measure the state of the indoor environment or the outdoor environment, an indoor environment model creation device 10 configured to create an indoor environment model, and an air-conditioning control device 20 configured to control the air-conditioning equipment 2 by predicting the indoor environment with the use of an indoor environment model created in the indoor environment model creation device 10. The air-conditioning equipment 2, the indoor environment model creation device 10, and the air-conditioning control device 20 are connected by, for example, a network or a signal line in a manner that allows data transmission to and from one another. While a case in which the indoor environment model creation device 10 and the air-conditioning control device 20 are separate pieces of hardware (for example, computers) is illustrated in FIG. 1 as an example, the same piece of hardware (for example, computer) may be used as the indoor environment model creation device 10 and the air-conditioning control device 20.

The air-conditioning equipment 2 is configured to condition the air in an indoor environment, and includes an air-conditioning device 2A configured to condition the air in an indoor space and a ventilator 2B configured to ventilate an indoor space. The air-conditioning equipment 2 may include a plurality of air-conditioning devices 2A, and each air-conditioning device 2A can be a multi-air conditioner for buildings that includes an indoor unit and an outdoor unit, a packaged air conditioner, a room air conditioner, or a large-sized heat source apparatus, for example, an absorption refrigerating machine. The air-conditioning equipment 2 is not limited to the type that includes the air-conditioning device 2A and the ventilator 2B, and may be of a type that includes other air-conditioning apparatus, for example, an outside air-conditioning apparatus, a humidifier, or a dehumidifier.

The sensor group 3 includes an indoor humidity sensor 3A configured to measure indoor humidity and a $CO_2$ concentration sensor 3B configured to measure $CO_2$ concentration in a room. The sensor group 3 transmits various types of measured information to the indoor environment model creation device 10 and the air-conditioning control device 20 over the network. A plurality of indoor humidity sensors 3A and a plurality of $CO_2$ concentration sensors 3B may be installed in a room. The sensor group 3, which is connected via a network in the illustrated example, may instead be installed by being incorporated in the air-conditioning equipment 2 to transmit measured data from the air-conditioning equipment 2 to the indoor environment model creation device 10 and the air-conditioning control device 20. The sensor group 3 in this case may be set up along an intake air flow path in the air-conditioning equipment 2, for example, near the ventilator 2B to use measured data as a value representing the indoor environment.

A meteorological data distribution server 4 configured to distribute meteorological data is also connected to the air-conditioning control system 1 via the network. The indoor environment model creation device 10 and the air-conditioning control device 20 obtain meteorological data from the meteorological data distribution server 4 over the network. The meteorological data includes the amount of solar radiation, the outside air temperature, the outside air humidity, and other types of data at a site where the air-conditioning equipment 2 is installed. The meteorological data, which is distributed via the meteorological data distribution server 4 in the illustrated example, may instead be obtained from an outdoor measurement sensor that is installed outside the building and that is included in the sensor group 3.

The indoor environment model creation device 10 is configured to create an indoor environment model to be used to predict changes with time of the indoor environment. As described later, the indoor environment model includes a plurality of physics models in which a heat conduction equation about the indoor temperature, a mass transfer equation about moisture (humidity), and a mass transfer equation about the $CO_2$ concentration are included.

The air-conditioning control device 20 is configured to create a future operation schedule of the air-conditioning equipment 2 with the use of an indoor environment model created in the indoor environment model creation device 10, and to control the air-conditioning equipment 2 accordingly. The air-conditioning control device 20 includes an indoor environment prediction unit 21, a model database 22, a schedule creation unit 23, and an air-conditioning control unit 24.

The indoor environment prediction unit 21 is configured to predict changes of the indoor environment over a given period with the use of an indoor environment model stored in the model database 22. The model database 22 stores an indoor environment model created in the indoor environment model creation device 10. The model database 22 also stores, among others, air-conditioning equipment characteristics data, and various learned parameters of the indoor environment model which are described later. The indoor environment prediction unit 21 obtains operation data, measurement data, and meteorological data from the air-conditioning equipment 2, the sensor group 3, and the meteorological data distribution server 4, respectively, and uses the obtained data as prediction-use input data to calculate predicted values of the future (for example, the next day) indoor temperature, indoor humidity, and indoor $CO_2$ concentration based on a temperature model, a humidity model, and a $CO_2$ model.

The schedule creation unit 23 is configured to create an operation schedule of the air-conditioning equipment 2 for a scheduling target period (for example, the next day), based on an indoor environment that is predicted in the indoor environment prediction unit 21. Specifically, the schedule creation unit 23 creates an operation schedule of the air-conditioning device 2A so that, for example, the predicted value of the indoor temperature is maintained within a given comfortable temperature range while the indoor humidity is maintained within a given comfortable humidity range. The schedule creation unit 23 also creates the operation schedule of the ventilator 2B so that, for example, the $CO_2$ concentration is maintained within a given comfortable $CO_2$ concentration range. While the case of creating the operation schedule from the viewpoint of comfortableness is given here as an example, the operation schedule may instead be created from the viewpoint of demand control or other forms of saving power consumption.

Figure 2:
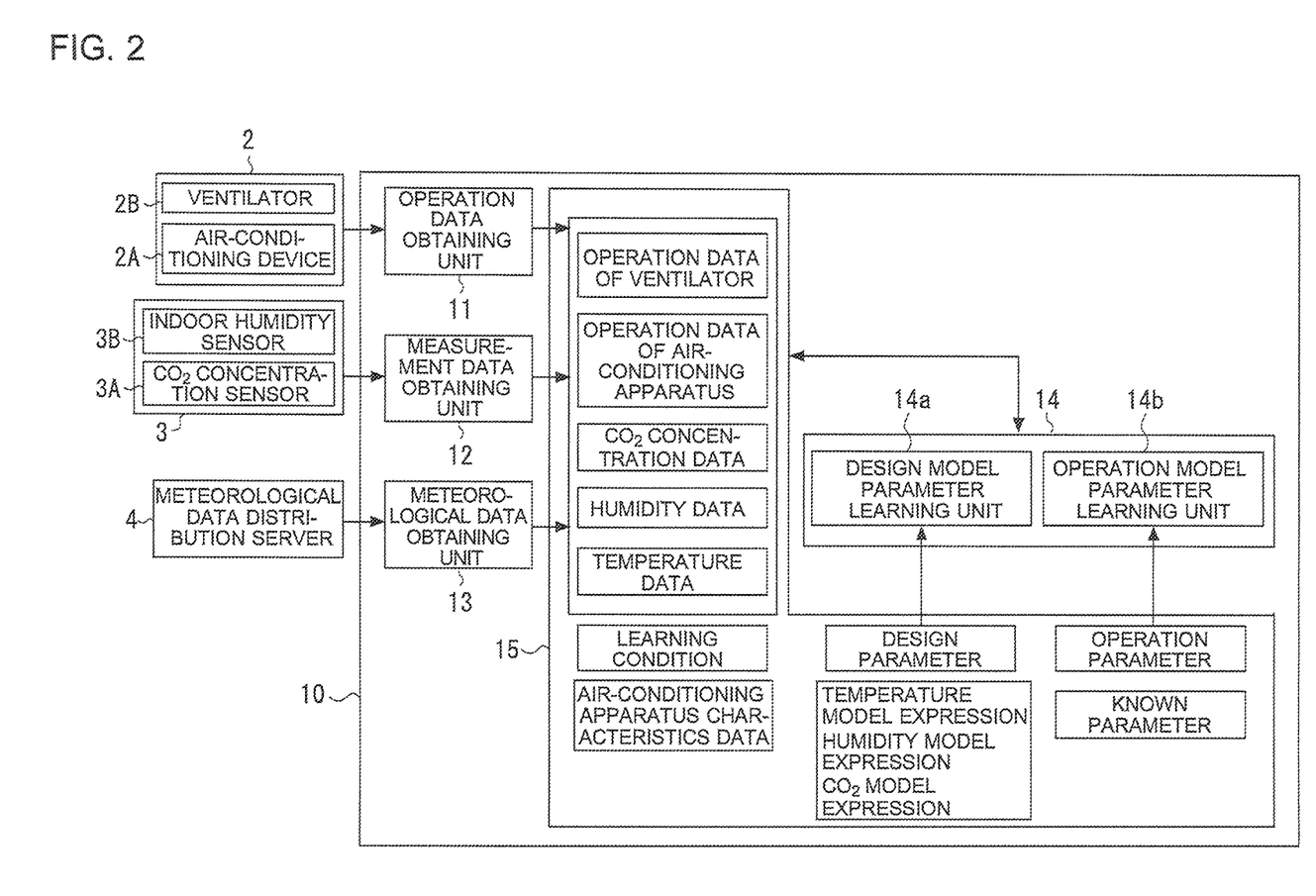
FIG. 2 is a block diagram for illustrating the configuration of the indoor environment model creation device according to the embodiment of the present invention.

FIG. 2 is a block diagram for illustrating an example of the indoor environment model creation device according to the embodiment of the present invention, and the indoor environment model creation device 10 is described with reference to FIG. 1 and FIG. 2. The configurations of the indoor environment model creation device 10 and the air-conditioning control device 20 that are illustrated in FIG. 1 and FIG. 2 are implemented by executing programs that are stored on magnetic disks, semiconductor memories, or other storage devices on microcomputers, computers, or other pieces of hardware. The indoor environment model creation device 10 of FIG. 2 is, as described above, configured to create an indoor environment model of an indoor space in which the air-conditioning equipment 2 configured to condition air is installed. The indoor environment model creation device 10 includes an operation data obtaining unit 11, a measurement data obtaining unit 12, a meteorological data obtaining unit 13, a model parameter learning unit 14, and a data storage unit 15.

The operation data obtaining unit 11 is configured to obtain operation data from the air-conditioning equipment 2 and to store the obtained data in the data storage unit 15. The measurement data obtaining unit 12 is configured to obtain measurement data measured by the sensor group 3 and to store the obtained data in the data storage unit 15. The operation data includes, at least, the amount of heat supplied to or removed from the interior of the room by the air-conditioning device 2A, and the indoor temperature. The measurement data includes, among others, the indoor humidity and the $CO_2$ concentration in the room. When obtaining the amount of heat is not possible, the amount of heat may be calculated from, for example, the operation frequency of the outdoor unit of the air-conditioning device 2A, and an evaporating temperature, a condensing temperature, or other types of data obtained by an existing sensor. The indoor temperature may be substituted with the intake temperature of the indoor unit. Other than obtaining the indoor temperature from air-conditioning apparatus operation data, the measurement data obtaining unit 12 may obtain indoor temperature data from a temperature sensor installed in the room as one of sensors in the sensor group 3. The operation data of the ventilator 2B is typically, for example, the output (for example, on/off, high/intermediate/low, discrete output in percentage, or continuous output in percentage) of the ventilator 2B at each time point, or the ventilation air volume, but is not limited thereto. In the following description, "high/intermediate/low" and "stop" of the output of the ventilator 2B are used as the operation data of the ventilator 2B for simplification.

The meteorological data obtaining unit 13 is connected to, for example, the meteorological data distribution server 4 via the network to obtain meteorological data at the site where the air-conditioning equipment 2 is installed. The meteorological data includes at least the amount of solar radiation, the outside air temperature, and the outside air humidity. The meteorological data obtaining unit 13 stores the meteorological data in the data storage unit 15 as measurement data.

The operation data obtaining unit 11, measurement data obtaining unit 12, and meteorological data obtaining unit 13 described above obtains data at given time intervals (for example, 5-minute intervals) and store the obtained data in the data storage unit 15. Although a short interval, for example, 1-minute intervals, is preferred as a data obtaining interval in terms of the accuracy of the model, the data may be obtained at 10-minute intervals, 30-minute intervals, or other intervals. The operation data, the measurement data, and the meteorological data that are obtained at 1-minute intervals may be thinned out to, for example, 5-minute interval data when used for learning, depending on the storage capacity of the data storage unit 15, the processing performance of the model parameter learning unit 14, the length of calculation time permitted to create a model, and other factors. The operation data of the air-conditioning device 2A and the ventilator 2B and the humidity and $CO_2$ concentration data may be stored at different time intervals.

The model parameter learning unit 14 is configured to learn a plurality of physics models comprehensively with the use of learning-use input data stored in the data storage unit 15. The learning-use input data is operation data, measurement data, and meteorological data that are obtained in the past and stored in the data storage unit 15. An indoor environment model includes a plurality of physics models in which a heat parameter, a moisture parameter, and a $CO_2$ concentration parameter are included. To describe in more detail, an indoor temperature model expressed by a heat conduction equation, an indoor humidity model expressed by a mass transfer equation about moisture, and a $CO_2$ concentration model expressed by a mass transfer equation about the $CO_2$ concentration are included among the plurality of physics models.

An example of the methods of learning the plurality of physics models comprehensively involves concurrently determining a common parameter, which is common to all of the plurality of physics models, and a unique parameter, which is determined for each physics model as a parameter unique to the physics model, by solving all of the plurality of physics models simultaneously and performing convergence calculation. Alternatively, a model may be learned in two steps. In the first step, one or more of the plurality of physics models are selected in order to determine a parameter that is common to all of the plurality of physics models and to determine for each physics model a parameter that is unique to the physics model. In the second step, one or more of the remaining physics models are selected, the value of a parameter common to the plurality of physics models that is included in the physics model(s) selected in the second step is determined as a value learned in the first step, and only a parameter value (parameter values) that is uniquely included in the physics model(s) selected in the second step is determined as a value learned in the second step.

Figure 3:
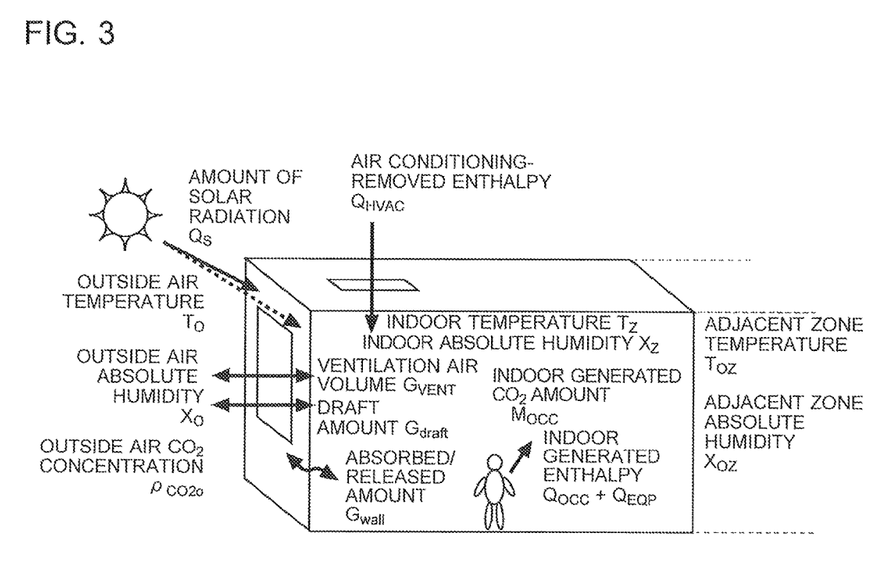
FIG. 3 is a schematic diagram for illustrating an example of factors considered when an indoor environment model of FIG. 2 is learned.

The indoor environment model is outlined first. One indoor environment model includes three physics models: an indoor temperature model, an indoor humidity model, and a $CO_2$ concentration model. Models given below are an example, and the physics models are not necessarily limited to expressions given below. FIG. 3 is a schematic diagram for illustrating an example of factors that are considered when the indoor environment model of FIG. 2 is learned. A case in which one floor is made up of one zone is illustrated in FIG. 3. Examples of factors of the indoor environment in a space to be air-conditioned are an outside air temperature $T_O$, an outside air absolute humidity $X_O$, an outside air $CO_2$ concentration $\rho_{CO2o}$, an amount of solar radiation $Q_S$, an adjacent zone temperature $T_{OZ}$, an adjacent zone absolute humidity $X_{OZ}$, an adjacent zone $CO_2$ concentration, an indoor temperature $T_Z$, an indoor absolute humidity $X_Z$, an indoor $CO_2$ concentration $\rho_{CO2Z}$, an air conditioning-removed (-supplied) enthalpy $Q_{HVAC}$, an indoor generated enthalpy (lighting+human body+office automation (OA) equipment) $Q_{OCC}+Q_{EDP}$, an indoor generated $CO_2$ amount $M_{OCC}$, a ventilation amount $G_{vent}$, a draft amount $G_{draft}$, and the amount of humidity $G_{wall}$ absorbed from/released into a wall. When one zone is on one floor, there are no adjacent zone factors to consider, and the adjacent zone temperature $T_{OZ}$, the adjacent zone absolute humidity $X_{OZ}$, and the adjacent zone $CO_2$ concentration are therefore ignored.

A theoretical formula (mathematical expression model) based on a heat conduction equation that uses the factors given above is expressed by Expression (1) to Expression (3). An indoor humidity theoretical formula (mathematical expression model) based on a mass transfer equation that uses the factors of FIG. 3 is expressed by Expression (4). A $CO_2$ concentration theoretical formula (mathematical expression model) based on a mass transfer equation that uses the factors of FIG. 3 is expressed by Expression (5).

[Expression 1]
$$C_1 \frac{dT_1}{dt} = \alpha Q_s + \frac{T_o - T_1}{R_1} + \frac{T_2 - T_1}{R_2} \quad (1)$$

[Expression 2]
$$C_2 \frac{dT_2}{dt} = \beta Q_s + \frac{T_1 - T_2}{R_2} + \frac{T_z - T_2}{R_z} \quad (2)$$

[Expression 3]
$$C_z \frac{dT_z}{dt} = \delta Q_{HVAC} + \gamma Q_{EQP} + \rho Q_{OCC} + $$
$$\rho C_p (G_{draft} + G_{vent})(T_o - T_z) + \frac{T_o - T_z}{R_3} + \frac{T_2 - T_z}{R_z} \quad (3)$$

[Expression 4]
$$\rho V \frac{dX_z}{dt} = \frac{\delta(1-SHF_{HVAC})Q_{HVAC}}{cl} + \frac{\varepsilon(1-SHF_{OCC})Q_{OCC}}{cl} +$$
$$\rho C_w (G_{draft} + G_{vent})(X_o - X_z) + \alpha_H \{(aT_2 + b)W_{RH} - X_z\} \quad (4)$$

[Expression 5]
$$V \frac{d\rho_{co2z}}{dt} = (\rho_{co2o} - \rho_{co2z})(G_{vent} + G_{draft}) + M_{occ} \quad (5)$$

In Expression (1) to Expression (5), $C_1$ represents an exterior wall outdoor-side heat capacity [kJ/K], $C_2$ represents an exterior wall indoor-side heat capacity [kJ/K], $C_Z$ represents an indoor heat capacity [kJ/K], $G_{vent}$ represents the ventilation amount [m³/s], $G_{draft}$ represents the draft amount [m³/s], $W_{hvac}$ represents a dehumidification amount [kg/s] that is the amount of humidity removed by the air-conditioning apparatus, $R_1$ represents an outdoor-side heat resistance [K/kW], $R_2$ represents an exterior wall heat resistance [K/kW], $R_3$ represents a heat resistance [K/kW] of places other than the exterior wall, $R_Z$ represents an indoor-side heat resistance [K/kW], $T_0$ represents the outside air temperature [degrees C.], $T_1$ represents an exterior wall outdoor-side surface temperature [degrees C.], $T_2$ represents an exterior wall indoor-side surface temperature [degrees C.], $T_Z$ represents the indoor temperature [degrees C.], $Q_S$ represents the amount of solar radiation [kW/m²], $Q_{OCC}$ represents a human body-generated heat [kW], $Q_{EQP}$ represents an equipment-generated heat [kW], $Q_{HVAC}$ represents an air conditioning-removed (-supplied) heat amount [kW], $\alpha$ represents a coefficient of the amount of solar insolation transmitted to the interior of the room, $\beta$ represents a coefficient of the amount of solar insolation on the exterior wall, $\gamma$ represents a coefficient of the heat generated by equipment, and $\delta$ represents a coefficient of the amount of heat removed (supplied) by air conditioning.

The symbol V represents a room capacity [m³], $\rho$ represents an air density [kg/m³], $X_z$ represents the indoor absolute humidity [kg/kg (DA)], $X_o$ represents the outside air absolute humidity [kg/kg (DA)], $\alpha_h$ represents a representative surface humidity transmission ratio, a represents a slope [kg/h(kg/kg (DA))] of a saturated vapor amount approximated curve, b represents an intercept [kg/h(kg/kg (DA))] of a saturated vapor amount approximated curve, $W_{RH}$ represents a wall surface relative humidity, cl represents a latent heat of water vaporization at 0 degrees Celsius [kJ/kg], $\varepsilon$ represents a coefficient of human body-generated heat, $\rho_{CO2o}$ represents the outside air $CO_2$ concentration [ppm], $\rho_{CO2z}$ represents the indoor $CO_2$ concentration [ppm], and $M_{OCC}$ represents a human body-generated $CO_2$ amount [m³/s].

The theoretical formulae of Expression (1) to Expression (5) are substituted with physics models that are expressed by Expression (6) to Expression (10). Specifically, the theoretical formula (mathematical expression model) based on the mass transfer equation of Expression (1) to Expression (3) is substituted with an indoor temperature model expressed by Expression (6) to Expression (8). The indoor humidity theoretical formula (mathematical expression model) based on the mass transfer equation of Expression (4) is substituted with an indoor humidity model expressed by Expression (9). The $CO_2$ concentration theoretical formula (mathematical expression model) based on the mass transfer equation of Expression (5) is substituted with a $CO_2$ concentration model expressed by Expression (10).

[Expression 6]
$$\frac{C_1}{2(w+d)h} \frac{dT_1}{dt} = \alpha Q_s + \frac{T_o - T_1}{2(w+d)hR'_1} + \frac{T_2 - T_1}{2(w+d)hR'_2} \quad (6)$$

[Expression 7]
$$\frac{C_2}{2(w+d)h} \frac{dT_2}{dt} = \beta Q_s + \frac{T_1 - T_2}{2(w+d)hR_2} + \frac{T_z - T_2}{2(w+d)hR_z} \quad (7)$$

[Expression 8]
$$\frac{C_z}{2(w+d)h} \frac{dT_z}{dt} = \delta Q_{HVAC} + P_{occ}wdN_{occ}(\gamma Q_{EQP} + \rho^i Q^i_{OCC}) +$$
$$\rho C_p (N_{draft}wdh + P_{vent}G_v N_{occ}wd)(T_o - T_z) +$$
$$\frac{T_o - T_z}{2(w+d)hR_3} + \frac{T_2 - T_z}{2(w+d)hR_z} \quad (8)$$

[Expression 9]
$$pwdh \frac{dX_z}{dt} = \frac{\delta P_{occ}wdN_{occ}(1-SHF_{HVAC})Q_{HVAC}}{cl} +$$
$$\frac{\rho P_{occ}wdN_{occ}(1-SHF_{OCC})Q_{OCC}}{cl} +$$
$$\rho C_w (N_{draft}wdh + P_{vent}G_v N_{occ}wd)(X_o - X_z) +$$
$$\eta W_{humi} + \alpha_H \{(aT_2 + b)W_{RH} - X_z\} \quad (9)$$

-continued

[Expression 10]

$$h\frac{d\rho_z}{dt} = (\rho_0 - \rho_z)(G_v N_{occ} P_{vent} + N_{draft}h) + P_{occ}N_{occ}M \quad (10)$$

In Expression (6) to Expression (10), w represents a width [m] of the room, d represents a depth [m] of the room, h represents a ceiling height [m] of the room, $Q_{OCC}$, represents a human body-generated heat per person [kW/head], $Q_{EQP}$, represents an equipment-generated heat per person [kW/head], $R_1$, represents an outdoor-side heat resistance per unit area [(K·m²)/kW], $R_2$, represents an exterior wall heat resistance per unit area [(K·m²)/kW], $R_3$, represents a heat resistance of places other than the exterior wall per unit area [(K·m²)/kW], $R_Z$, represents an indoor-side heat resistance per unit area [(K·m²)/kW], $N_{OCC}$ represents a design density of people in the room [people/m²], $N_{draft}$ represents a draft-equivalent ventilation count [count/h], $G_v$ represents a design ventilation air volume [m³/(head·h)], $P_{OCC}$ represents a room occupation pattern, and $P_{vent}$ represents a ventilation pattern.

In Expression (6) to Expression (10), the room occupation pattern $P_{OCC}$ is a parameter that indicates a room occupation ratio (=0 to 1.0) at each time point, for example, for every hour, and takes a value "1" when all people are in the room, and a value "0" when no one is in the room. The ventilation pattern $P_{vent}$ is a proportion to a rated ventilation amount at each time point, for example, for every hour, and takes a value "1" when the ventilation air volume is the rated air volume, and a value "0" when ventilation is stopped.

In Expression (6) to Expression (10), a value obtained by the operation data obtaining unit 11 is used as the air conditioning-removed (-supplied) enthalpy $Q_{HVAC}$ without modification when obtaining the value is executable. When the operation data obtaining unit 11 cannot obtain the value, the amount of heat is calculated with the use of air-conditioning apparatus characteristics data. For instance, Expression (11) indicating a relation between an outdoor unit compressor frequency f, an evaporating temperature ET, a condensing temperature CT, and a supplied heat amount is prepared as air-conditioning apparatus characteristics data, and coefficients that vary depending on the type of the compressor are given as coefficients a, b, c, and d in Expression (11). The coefficients a, b, c, and d in Expression (11) may instead be obtained from actually measured values. The relation between the outdoor unit compressor frequency f, the evaporating temperature ET, the condensing temperature CT, and the supplied heat amount may be calculated with the use of an air-conditioning apparatus model that is created by modeling a refrigerant circuit of the outdoor unit.

[Expression 11]

$$\Delta Q = a*f(CT-ET)b*f+c \quad (11)$$

The indoor environment model expressed by Expression (6) to Expression (10) includes a plurality of parameters, which can be classified into three: (1) design parameters, (2) operation parameters, and (3) known parameters.

(1) The design parameters are parameters that represent design elements of the air-conditioning equipment and the indoor space, and that have fixed values, for example, the room width w, the room depth d, the ceiling height h, the design ventilation air volume $G_V$, the design density $N_{OCC}$ of people in the room, the draft-equivalent ventilation count $N_{draft}$, the exterior wall heat resistance $R_2$, the exterior wall heat capacity $C_1$, the exterior wall heat capacity $C_2$, the coefficient α of the amount of solar insolation transmitted to the interior of the room, the coefficient β of the amount of solar insolation on the exterior wall, the coefficient γ of the equipment-generated heat, the coefficient δ of the air conditioning-removed (-supplied) heat amount, the coefficient ε of the human body-generated heat, a latent heat proportion $SHF_{OCC}$ in the air-conditioning apparatus processing enthalpy, the representative surface humidity transmission ratio $\alpha_h$, and the wall surface relative humidity $W_{RH}$.

(2) The operation parameters are parameters indicating the characteristics of heat, vapor, and $CO_2$ generation sources that change with time. The characteristic of heat, vapor, and $CO_2$ generation sources are data that is in proportion to, or otherwise correlated to, the amounts of heat, vapor, and $CO_2$ generated, for example, changes with time of the number of people at work in a room, namely, the room occupation pattern $P_{OCC}$ of workers.

(3) The known parameters are already known parameters that can be set by a user in advance from design information of the equipment, literature data, or other sources, for example, the outside air $CO_2$ concentration $\rho_{CO2o}$, the per-person human body-generated enthalpy $Q_{OCC}$, the generated $CO_2$ amount $M_{OCC}$, the latent heat proportion $SHF_{OCC}$ in the human body-generated enthalpy, and the air density ρ. When one of the design parameters has a value known from design information of the equipment or other information, the parameter may be classified as a known parameter.

The model parameter learning unit 14 of FIG. 2 is configured to learn a plurality of physics models comprehensively with the use of learning-use input data stored in the data storage unit 15. First, the air-conditioning equipment 2 is run during, for example, a learning target period (for example, a week) when parameters of an indoor environment model are learned, and operation data and measurement data in the learning target period are obtained to be stored in the data storage unit 15. The model parameter learning unit 14 uses the operation data and the measurement data in the learning target period as learning-use input data, and learns parameters of the indoor environment model.

The data storage unit 15 also stores learning conditions used in parameter learning. The learning conditions are, for example, apparatus information about an air-conditioning system to be learned, a given period (for example, a week) in which the operation data and measurement data used to learn parameters are obtained, and a condition for ending the learning. Examples of the ending condition include whether the accuracy of $CO_2$ concentration prediction has reached a given accuracy, whether a given improvement ratio has been reached, whether the learning time has reached a given maximum learning time, and whether the learning repetition count has reached a given maximum repetition count. The ending conditions are given as learning conditions. Results of the learning are then stored in the data storage unit 15. The user sets a target building number, a learning period, and other learning conditions, and the model parameter learning unit 14 extracts learning-use input data that is needed from the data storage unit 15.

The data storage unit 15 further stores air-conditioning apparatus characteristics data, which indicates the performance of the air-conditioning apparatus. The air-conditioning apparatus characteristics data may be registered by the user, or may be estimated from the operation data. When the operation data obtaining unit 11 cannot obtain the amount of data supplied (removed) by the air-conditioning apparatus, and the heat amount needs to be calculated from the outdoor unit operation frequency or from other types of information as described above, the air-conditioning apparatus characteristics data includes a relation between the operation frequency of each outdoor unit, the evaporating temperature, the condensing temperature, and the supplied heat amount.

Various parameters included in the indoor environment model of Expression (6) to Expression (10) are classified into three as described above, and the temperature model, the humidity model, and the $CO_2$ model that are expressed by Expression (6) to Expression (10) include a common parameter. The model parameter learning unit 14 comprehensively learns a parameter common to a plurality of physics models (the indoor temperature model, the indoor humidity model, and the $CO_2$ model) for each parameter classification. Specifically, the model parameter learning unit 14 includes a design model parameter learning unit 14a configured to learn design parameters in a plurality of physics models and an operation model parameter learning unit 14b configured to learn operation parameters in a plurality of physics models.

In other words, the model parameter learning unit 14 simultaneously solves a physics model that includes a parameter included in common in all of a plurality of physics models and a heat parameter (for example, the indoor temperature model), a physics model that includes the parameter included in all of the plurality of physics models and a moisture parameter (for example, the indoor humidity model), and a physics model that includes the parameter included in common in all of the plurality of physics models and a $CO_2$ concentration parameter (for example, the $CO_2$ model), and performs convergence calculation, to thereby concurrently determine all parameters that are included in all physics models and learn the models.

(Design Model Parameter Learning Unit 14a)

The design model parameter learning unit 14a is configured to learn design parameters out of parameters classified into the three categories described above. The design model parameter learning unit 14a first sets design parameters of an indoor environment model to given values and fixes an operation parameter (a seated ratio) to a given value. In this state, the design model parameter learning unit 14a inputs learning-use input data and known data that are stored in the data storage unit 15 to Expression (6) to Expression (10). Specifically, an air-conditioning apparatus-supplied heat amount calculated from operation data of the air-conditioning device 2A which is data actually measured for a given period in the past, a ventilation amount pattern calculated from operation data of the ventilator 2B, the amount of solar radiation, the outside air temperature, and the outside air humidity are input to the indoor environment model. Changes with time of the indoor temperature, of the indoor humidity, and of the $CO_2$ concentration are output from the indoor environment model expressed by Expression (6) to Expression (10) as a result.

The design model parameter learning unit 14a next compares, for evaluation, the results output from the indoor environment model to an indoor temperature, a humidity, and a $CO_2$ concentration that are actually measured for a given period by the sensor group 3. In the evaluation, the design model parameter learning unit 14a calculates, for example, a root mean square error (RMSE) between the results output from the indoor environment model and the actually measured data, as an evaluation value of the design parameters having given values.

The design model parameter learning unit 14a next changes the value of at least one of the plurality of parameters classified as design parameters. The design model parameter learning unit 14a then inputs the learning-use input data and the known data to the indoor environment model in which the design parameter has been changed, to thereby obtain results output from the indoor environment model regarding the indoor temperature, the humidity, and the $CO_2$ concentration. The design model parameter learning unit 14a calculates a root mean square error (RMSE) between the output results and indoor temperature data, humidity data, and $CO_2$ concentration data actually measured for a given period, as an evaluation value of the changed design parameters.

The design model parameter learning unit 14a compares the evaluation value calculated before the design parameters are changed to the evaluation value calculated after the design parameters are changed. When the evaluation value calculated after the design parameters are changed is lower than the evaluation value calculated before the change, it is determined that the changed design parameters have optimized values, and the values of the design parameters are updated. When the evaluation value calculated after the design parameters are changed is equal to or higher than the evaluation value of the given values of the last time, on the other hand, it is determined that the design parameters of the last time have optimized values, and the design parameter values of the last time are retained. In this manner, the design model parameter learning unit 14a learns design parameters and executes optimization while performing convergence calculation based on evaluation values.

The design model parameter learning unit 14a learns design parameters of the indoor temperature model, the indoor humidity model, and the $CO_2$ model comprehensively, instead of learning design parameters of the models individually. In other words, three physics models, namely, the indoor temperature model, the indoor humidity model, and the $CO_2$ model, are learned concurrently with the use of the same design parameters.

The design model parameter learning unit 14a changes, evaluates, and updates design parameters a set number of times of repetition. In the learning of design parameters, an upper limit value and a lower limit value are set as learning conditions to the value of each design parameter, based on a somewhat adequate value that is design information of the equipment, a value obtained from a literature, or other such values. The design model parameter learning unit 14a executes the learning while taking care that the design parameter does not exceed the upper limit value or drop lower than the lower limit value.

(Operation Model Parameter Learning Unit 14b)

The operation model parameter learning unit 14b is configured to learn operation parameters out of parameters of an indoor environment model that are classified into the three categories described above. The operation model parameter learning unit 14b first sets operation parameters of an indoor environment model to given values, and fixes setting parameters to given values. In this state, the operation model parameter learning unit 14b inputs learning-use input data and known data that are stored in the data storage unit 15 to Expression (6) to Expression (10). Specifically, an air-conditioning apparatus-supplied heat amount calculated from operation data of the air-conditioning device 2A which is data actually measured for a given period in the past, a ventilation amount pattern calculated from operation data of the ventilator 2B, the amount of solar radiation, the outside air temperature, and the outside air humidity are input to the indoor environment model. Changes with time of the indoor temperature, of the indoor humidity, and of the $CO_2$ concentration are output from Expression (6) to Expression (10) as a result.

The operation model parameter learning unit 14b next compares, for evaluation, the results output from the indoor environment model to an indoor temperature, a humidity, and a $CO_2$ concentration that are actually measured for a given period by the sensor group 3. In the evaluation, the operation model parameter learning unit 14b calculates, for example, a root mean square error (RMSE) between the results output from the indoor environment model and the actually measured data, as an evaluation value of the operation parameters having given values.

The operation model parameter learning unit 14b next changes the value of at least one of the plurality of parameters classified as operation parameters. Specifically, the operation model parameter learning unit 14b changes the value of the room occupation ratio of at least one time point in the room occupation pattern described above. The operation model parameter learning unit 14b then obtains output results regarding the indoor temperature, the humidity, and the $CO_2$ concentration, based on the indoor environment model in which the operation parameter has been changed, the learning-use input data, and the known data are input. The operation model parameter learning unit 14b then calculates a root mean square error (RMSE) between the output results and indoor temperature data, humidity data, and $CO_2$ concentration data actually measured for a given period, as an evaluation value of the changed operation parameters.

The operation model parameter learning unit 14b compares the evaluation value calculated before the operation parameters are changed to the evaluation value calculated after the operation parameters are changed. When the evaluation value calculated after the operation parameters are changed is lower than the evaluation value calculated before the change, it is determined that the changed operation parameters have optimized values, and the values of the operation parameters are updated. When the evaluation value calculated after the operation parameters are changed is equal to or higher than the evaluation of the given values of the last time, on the other hand, it is determined that the operation parameters of the last time have optimized values, and the operation parameter values of the last time are retained.

The operation model parameter learning unit 14b learns operation parameters of the indoor temperature model, the indoor humidity model, and the $CO_2$ model comprehensively, instead of learning operation parameters of the models individually. In other words, three physics models, namely, the indoor temperature model, the indoor humidity model, and the $CO_2$ model, are learned concurrently with the use of the same operation parameters.

The operation model parameter learning unit 14b changes, evaluates, and updates operation parameters a set number of times of repetition. In the learning of operation parameters, an upper limit value and a lower limit value are set as learning conditions to the value of each operation parameter, based on a somewhat adequate value that is design information of the equipment, a value obtained from a literature, or other such values. The operation model parameter learning unit 14b executes the learning while taking care that the operation parameter does not exceed the upper limit value or drop lower than the lower limit value. In this manner, the operation model parameter learning unit 14b learns operation parameters of the temperature model, the humidity model, and the $CO_2$ model comprehensively instead of individually.

While the case of using a root mean square error (RMSE) as an evaluation value in the learning of design parameters and the learning of operation parameters is described as an example, a different indicator may be used for the evaluation. In the learning of operation parameters, a plurality of patterns may be prepared as the post-change room occupation pattern $P_{OCC}$, depending on the running state of the target building. For instance, different patterns may be prepared for weekdays and weekends, or a pattern for Wednesday may be varied from a pattern for Monday, Tuesday, Thursday, and Friday in the case where workers are supposed to go home at a quitting time every Wednesday. Cases in which the effect of learning is small, for example, a case in which the room occupation ratio of workers, who are sources of $CO_2$ generation, is very low on holidays, and a case in which the effect of energy saving control of the ventilator 2B is small, may be excluded as cases to be learned. The model parameter learning unit 14 may calculate a ventilation amount pattern from the pattern of operation data of the ventilator 2B and from the rated air volume of the ventilator 2B when the operation data pattern is expressed with the use of "high", "intermediate", "low", and "stop".

(Processing Flow of Learning Parameters of an Indoor Environment Model)

Figure 4:
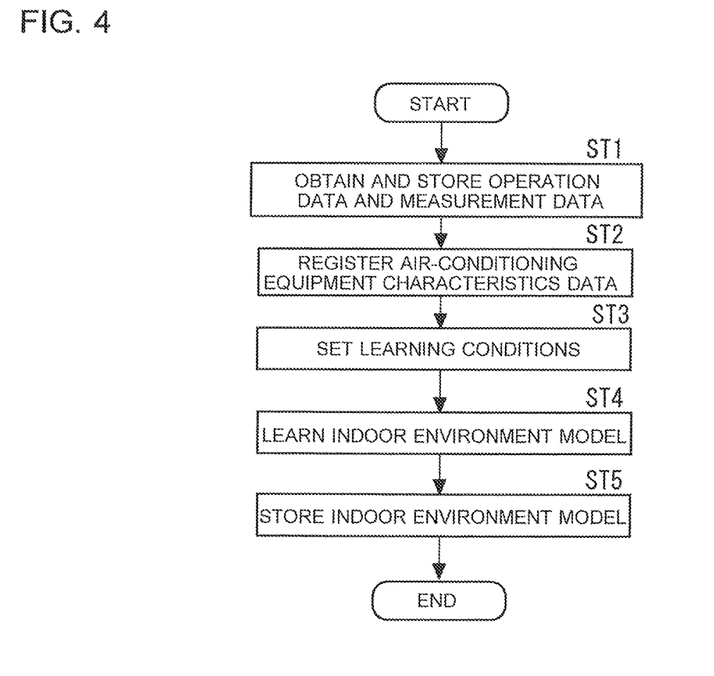
FIG. 4 is a flow chart for illustrating an operation example of the indoor environment model creation device of FIG. 2.

FIG. 4 is a flow chart for illustrating an operation example of the indoor environment model creation device of FIG. 2. Steps of learning an indoor environment model by the indoor environment model creation device are described with reference to FIG. 1 to FIG. 4. First, the operation data obtaining unit 11 obtains operation measurement data about the operation of the air-conditioning equipment 2 for a learning target period (as long as a week, for example), and stores the obtained data in the data storage unit 15 (Step ST1). Air-conditioning characteristics data of the air-conditioning equipment 2 is also stored in the data storage unit 15 (Step ST2). Learning conditions for learning the indoor environment model are further stored in the data storage unit 15 (Step ST3).

The model parameter learning unit 14 then learns the indoor environment model based on the operation measurement data, the air-conditioning characteristics data, and the learning conditions that are stored in the data storage unit 15 (Step ST4). The learning of the indoor environment model may be executed manually by an administrator or others, or may be executed automatically after the data collection is completed. The learned indoor environment model is stored in the data storage unit 15, and is also stored in the model database 22 (Step ST5).

Figure 5:
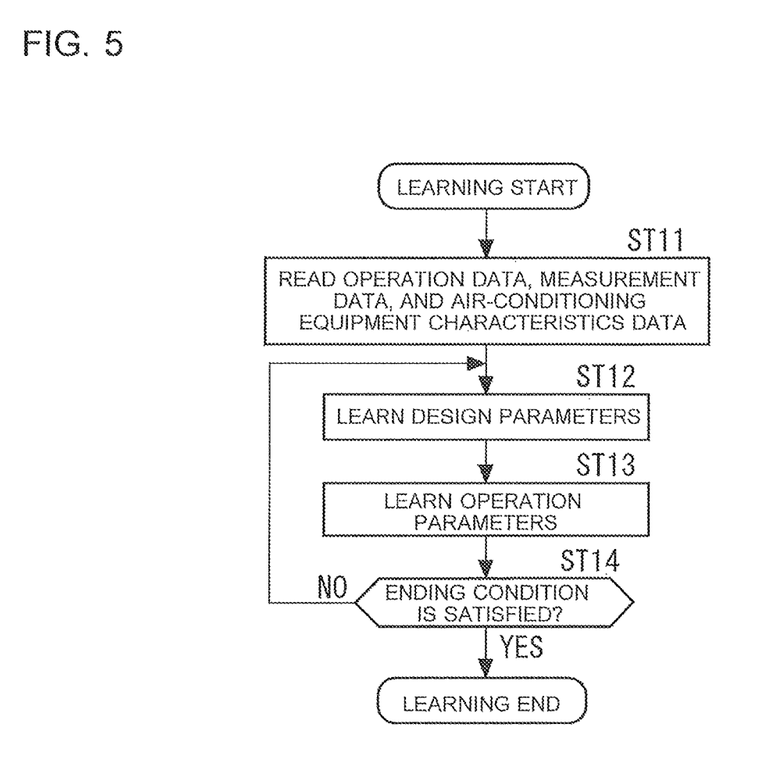
FIG. 5 is a flow chart for illustrating an example of an indoor environment model learning step of FIG. 4.

FIG. 5 is a flow chart for illustrating an example of the indoor environment model learning step of FIG. 4. In FIG. 5, learning-use input data (past operation measurement data), learning conditions, and air-conditioning equipment characteristics data that are stored in the data storage unit 15 are read out of the data storage unit 15 (Step ST11). Thereafter, the design model parameter learning unit 14a learns design parameters while setting operation parameters (the room occupation pattern $P_{OCC}$) to fixed values in Expression (6) to Expression (10) (Step ST12). In this step, the design model parameter learning unit 14a learns design parameters by changing the values of the design parameters a number of times.

Thereafter, the operation model parameter learning unit 14b learns operation parameters while setting design parameters to fixed values in Expression (6) to Expression (10) (Step ST13). The operation parameters are learned by changing the room occupation ratio, which is described in the description of the operation model parameter learning unit 14b, a number of times (Step ST14). The model parameter learning unit 14 determines, for the design parameter learning and for the operation parameter learning, whether or not the repetition count or other ending conditions are satisfied. When the learning ending condition is satisfied, the learned indoor environment model is stored in the data storage unit 15.

According to the embodiment described above, an indoor environment model that is highly accurate and consistent with physical phenomena can be obtained by comprehensively learning a plurality of physics models included in an indoor environment model. Specifically, because a temperature, a humidity, and a $CO_2$ concentration that are predicted from an indoor environment model vary depending on a common causal factor, the model parameter learning unit 14 comprehensively learns a plurality of physics models in which the common causal factor is included as a parameter. An indoor environment model consistent with reality can thus be obtained without setting a parameter unique to the building in advance. In addition, an indoor environment model based on a physics formula can be created without inputting a heat characteristics parameter and position information of each building and detailed building specifications (for example, the window area and the roof area).

Further, a highly accurate indoor environment model can be built without the fear of being affected by an error that is included in single data because an indoor environment model is learned with the use of a plurality of types of operation data and measurement data.

Parameters about the temperature, humidity, and $CO_2$ concentration characteristics of an individual building can also be learned by setting an appropriate upper limit value and lower limit value in advance that are determined from general indicators related to buildings and air-conditioning apparatus, or from design information, when an indoor environment model is learned.

Factors that have an effect on the temperature, the humidity, and the $CO_2$ concentration in a room include, among others, the number of people in the room, the ventilation air volume, the draft volume, and the building shape. The factors serve as common parameters that indicate physical quantities in the room. An indoor environment model that is versatile, highly accurate, and consistent with physical phenomena can accordingly be obtained without inputting parameters in advance, by comprehensively learning an indoor environment model that is made up of a plurality of physics models.

The model parameter learning unit 14 includes the design model parameter learning unit 14a, which is configured to concurrently learn design parameters in a plurality of physics models while changing the values of the design parameters with the values of operation parameters in the plurality of physics models fixed, and the operation model parameter learning unit 14b, which is configured to concurrently learn the operation parameters in the plurality of physics models while changing the values of the operation parameters with the values of the design parameters in the plurality of physics models fixed. In this case, learning is executed for each different factor separately, and an even more accurate model can accordingly be obtained.

The embodiment of the present invention is not limited to the above-mentioned embodiment, and various modifications may be made thereto without departing from the gist of the present invention as follows, for example. A case of learning operation parameters after learning design parameters is illustrated as an example in FIG. 5. A reverse execution order may be employed in which design parameters are learned after operation parameters are learned.

The repetition count in the learning of operation parameters and the repetition count in the learning of design parameters do not need to be the same. The learning repetition count in the design model parameter learning unit 14a and the operation model parameter learning unit 14b may be changed depending on the ending condition (loop count) that is included in learning conditions. For example, as the repetition count approaches a count set in the learning conditions, the repetition count in the design model parameter learning unit 14a and the operation model parameter learning unit 14b may gradually be increased or decreased at a fixed ratio or a stochastic ratio, or may be increased or decreased each time a given count is reached.

Parameters of an indoor environment model can be learned at appropriately set timing. For example, the creation of an indoor environment model by the indoor environment model creation device 10 is executed once at the time the indoor environment model creation device 10 is introduced. The indoor environment model is created after the collection of data necessary to learn the indoor environment model (for example, the collection of a week's worth of data) is completed. "A week" is given as an example, and a period suited to an accuracy required of the model, the storage capacity of the data storage unit 15, or other considerations can be set. For example, a day's worth of data, two weeks' worth of data, or a month's worth of data may be collected. In this manner, building design data, which does not normally change daily, and the room occupation pattern, which is normally similar on most days in the case of an office building, are determined once when the indoor environment model creation device 10 is introduced. The creation of the indoor environment model may be executed manually by the administrator or others, or may be executed automatically after the data collection is completed.

The indoor environment model creation device 10 may periodically create an indoor environment model. For instance, an indoor environment model may be updated by executing learning once a day. In this way, the room occupation pattern, which changes daily in actuality, can be learned with the use of most recent data, with the result that the learned room occupation pattern is even more consistent with the actual situation. Further, a correction of an error in the result of design parameter learning by data fitting is also expected. In short, the indoor environment model is updated daily with a model close to the immediate past situation. While the creation is executed once a day in the description given above, once a day is an example and an indoor environment model may be created once a month, at a change of seasons, or on other schedules. The creation may be executed irregularly, in response to an event that is expected to cause a significant change in room occupation pattern, for example, rearrangement of the floor layout or reorganization of the corporate structure.

Information about at which point the creation is to be executed is stored in the data storage unit 15 as a learning condition. For example, "once a day", "only when the next day is a weekday", or "execute automatically at 21:00" is stored. A period in which data used for learning is collected, and the time interval of the data do not need to be the same every time. For example, learning may use a week's worth of data when an indoor environment model is created at the time of introduction, whereas a day's worth of data is used for learning when an indoor environment model is created once a day. When the indoor environment model creation device 10 and air-conditioning control device 20 of FIG. 1 are the same piece of hardware (for example, computers), the data storage unit 15 of the indoor environment model creation device 10 and the model database 22 of the air-conditioning control device 20 may be unitary with each other.

The model parameter learning unit 14 only needs to comprehensively learn a plurality of physics models with the use of learning-use input data and measurement data that are stored in the data storage unit 15, and is not limited to the case described above in which all physics models are learned comprehensively by concurrently determining all parameters. For example, the model parameter learning unit 14 first selects out of a plurality of physics models (for example, an indoor temperature model, an indoor humidity model, and a $CO_2$ model) some physics models (for example, the indoor temperature model) as a learning target, and learns a parameter that is included in common in all of the plurality of physics models, and a parameter that is uniquely included in the target physics model. In the subsequent learning of the remaining physics models (for example, the indoor humidity model and the $CO_2$ model), the model parameter learning unit 14 may set thus first learned value as the value of a parameter common to all physics models, to learn, for each of the remaining physics models, only a parameter uniquely included in the remaining physics model. The model parameter learning unit 14 may thus learn a parameter common to all of a plurality of physics models, and a parameter uniquely included in each physics model, in three or more stages (for each of the three physics models).

REFERENCE SIGNS LIST 1 air-conditioning control system 2 air-conditioning equipment 2A air-conditioning device 2B ventilator 3 sensor group 3A indoor humidity sensor 3B $CO_2$ concentration sensor 4 meteorological data distribution server 10 indoor environment model creation device 11 operation data obtaining unit 12 measurement data obtaining unit 13 meteorological data obtaining unit 14 model parameter learning unit 14a design model parameter learning unit 14b operation model parameter learning unit 15 data storage unit 20 air-conditioning control device 21 indoor environment prediction unit 22 model database 23 schedule creation unit 24 air-conditioning control unit

The invention claimed is:

1. An indoor environment model creation device configured to create an indoor environment model of an indoor space in which air-conditioning equipment, a $CO_2$ sensor, and a humidity sensor are installed, the air-conditioning equipment being configured to condition air, the $CO_2$ sensor being configured to measure a $CO_2$ concentration in the indoor space, the humidity sensor being configured to measure an indoor humidity of the indoor space, the indoor environment model comprising a physics model including a heat parameter, a physics model including a moisture parameter, and a physics model including a $CO_2$ concentration parameter, the indoor environment model creation device comprising:

a memory configured to store operation data of the air-conditioning equipment in a learning target period as learning-use input data, and store measurement data measured by the $CO_2$ sensor and the humidity sensor; and processing circuitry configured to comprehensively learn a plurality of physics models with use of the learning-use input data and the measurement data stored in the memory, wherein the processing circuitry is configured to simultaneously solve a physics model comprising a parameter that is included in common in all of the plurality of physics models and the heat parameter, a physics model comprising a parameter that is common to all of the plurality of physics models and the moisture parameter, and a physics model comprising a parameter that is common to all of the plurality of physics models and the $CO_2$ concentration parameter, and to perform convergence calculation, to thereby concurrently determine all parameters that are included in all of the plurality of physics models, and learn the physics models.

2. The indoor environment model creation device of claim 1, wherein the plurality of physics models comprise a heat conduction equation, a mass transfer equation about moisture, and a mass transfer equation about the $CO_2$ concentration.

3. The indoor environment model creation device of claim 2, wherein the plurality of physics models comprise an indoor temperature model expressed by the heat conduction equation, an indoor humidity model expressed by the mass transfer equation about moisture, and a $CO_2$ concentration model expressed by the mass transfer equation about the $CO_2$ concentration.

4. The indoor environment model creation device of claim 1, wherein the plurality of physics models comprise parameters common to one another, and wherein the processing circuitry is configured to comprehensively learn the common parameters.

5. The indoor environment model creation device of claim 1, wherein the plurality of physics models comprise parameters classified into design parameters, which represent design elements of the air-conditioning equipment and the indoor space, and operation parameters, which comprise an occupancy parameter about an occupancy ratio, and wherein the processing circuitry is further configured to concurrently learn the design parameters in the plurality of physics models, while changing values of the design parameters, with the operation parameters in the plurality of physics models set to fixed values, and concurrently learn the operation parameters in the plurality of physics models, while changing values of the operation parameters, with the design parameters in the plurality of physics models set to fixed values.

6. The indoor environment model creation device of claim 5, wherein the processing circuitry is configured to learn the indoor environment model only from the operation data and the measurement data.

7. An indoor environment model creation device configured to create an indoor environment model of an indoor space in which air-conditioning equipment, a $CO_2$ sensor, and a humidity sensor are installed, the air-conditioning equipment being configured to condition air, the $CO_2$ sensor being configured to measure a $CO_2$ concentration in the indoor space, the humidity sensor being configured to measure an indoor humidity of the indoor space, the indoor environment model comprising a physics model including a heat parameter, a physics model including a moisture parameter, and a physics model including a $CO_2$ concentration parameter, the indoor environment model creation device comprising:
- a memory configured to store operation data of the air-conditioning equipment in a learning target period as learning-use input data, and store measurement data measured by the $CO_2$ sensor and the humidity sensor; and
- a processing circuitry configured to comprehensively learn a plurality of physics models with use of the learning-use input data and the measurement data stored in the memory, wherein the plurality of physics models consist of a physics model comprising a parameter that is included in common in all of the plurality of physics models and the heat parameter, a physics model comprising a parameter that is common to all of the plurality of physics models and the moisture parameter, and a physics model comprising a parameter that is common to all of the plurality of physics models and the $CO_2$ concentration parameter, and wherein the processing circuitry is configured to first select some of the plurality of physics models as a learning target, and learn the parameter that is included in common in all of the plurality of physics models and a parameter that is uniquely included in a target physics model, and, in learning of the remaining physics models, the processing circuitry is configured to set thus first learned value as a value of a parameter common to all physics models and learn, for each of the remaining physics models, only a parameter uniquely included in each of the remaining physics models.

8. The indoor environment model creation device of claim 7, wherein the processing circuitry is configured to learn, in three or more stages, a parameter common to all of the plurality of physics models, and a parameter uniquely included in each of the plurality of physics models.

9. A method, implemented by an indoor environment model creation device configured to create an indoor environment model of an indoor space in which air-conditioning equipment, a $CO_2$ sensor, and a humidity sensor are installed, the air-conditioning equipment being configured to condition air, the $CO_2$ sensor being configured to measure a $CO_2$ concentration in the indoor space, the humidity sensor being configured to measure an indoor humidity of the indoor space, the indoor environment model comprising a physics model including a heat parameter, a physics model including a moisture parameter, and a physics model including a $CO_2$ concentration parameter, the method comprising:
- storing, at a memory, operation data of the air-conditioning equipment in a learning target period as learning-use input data, and storing measurement data measured by the $CO_2$ sensor and the humidity sensor; and
- comprehensively learn a plurality of physics models with use of the learning-use input data and the measurement data stored in the memory, wherein the method includes simultaneously solving a physics model comprising a parameter that is included in common in all of the plurality of physics models and the heat parameter, a physics model comprising a parameter that is common to all of the plurality of physics models and the moisture parameter, and a physics model comprising a parameter that is common to all of the plurality of physics models and the $CO_2$ concentration parameter, and performing convergence calculation, to thereby concurrently determine all parameters that are included in all of the plurality of physics models, and learn the physics models.

* * * * *